United States Patent [19]

Mizusawa

[11] Patent Number: 4,774,981
[45] Date of Patent: Oct. 4, 1988

[54] CHECK VALVE

[75] Inventor: Akira Mizusawa, Yokohama, Japan

[73] Assignee: Nifco Inc., Yokohama, Japan

[21] Appl. No.: 156,364

[22] Filed: Feb. 16, 1988

[30] Foreign Application Priority Data

Feb. 20, 1987 [JP] Japan .............................. 62-22861[U]

[51] Int. Cl.[4] ............................................ F16K 15/03
[52] U.S. Cl. ................................ 137/512.1; 137/513.3; 137/515; 137/527
[58] Field of Search ................ 137/512.1, 513.3, 513.5, 137/515, 515.5, 515.7, 527, 527.6, 527.8

[56] References Cited

U.S. PATENT DOCUMENTS

| 2,877,792 | 3/1959 | Tybus | 137/513.3 |
| 3,023,771 | 3/1962 | Hinds | 137/512.1 X |
| 3,072,141 | 1/1963 | Wheeler, Jr. | 137/512.1 |
| 3,965,926 | 6/1976 | Buckner | 137/512.1 |
| 4,043,358 | 8/1977 | Sliski | 137/512.1 |
| 4,230,148 | 8/1980 | Ogle, Jr. | 137/512.1 |

FOREIGN PATENT DOCUMENTS 656812  1/1963  Canada .............................. 137/512.1

Primary Examiner—John Rivell
Attorney, Agent, or Firm—Trexler, Bushnell, Giangiorgi & Blackstone, Ltd.

[57] ABSTRACT

A check valve is disclosed, which comprises a hollow cylindrical valve body and a pair of substantially semi-circular symmetrical valve plates. The valve body has a pair of ear-like bearing projections projecting in a diametrically opposed relation to each other from an open end. The valve plates each have a straight edge with an integral pivot pin provided on one end portion and an integral bearing portion provided at the other end. The two valve plates are joined together by inserting the pivot pin of each of them through the bearing portion of the other. The pivot pins of the joined valve plates are fitted in the bearing projections of the valve body such that the valve plates can be pivotally moved when they are opened and closed.

1 Claim, 2 Drawing Sheets

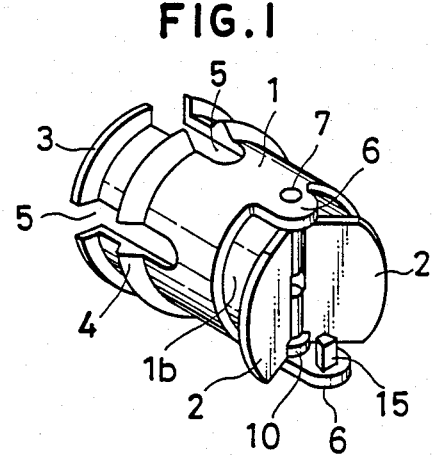
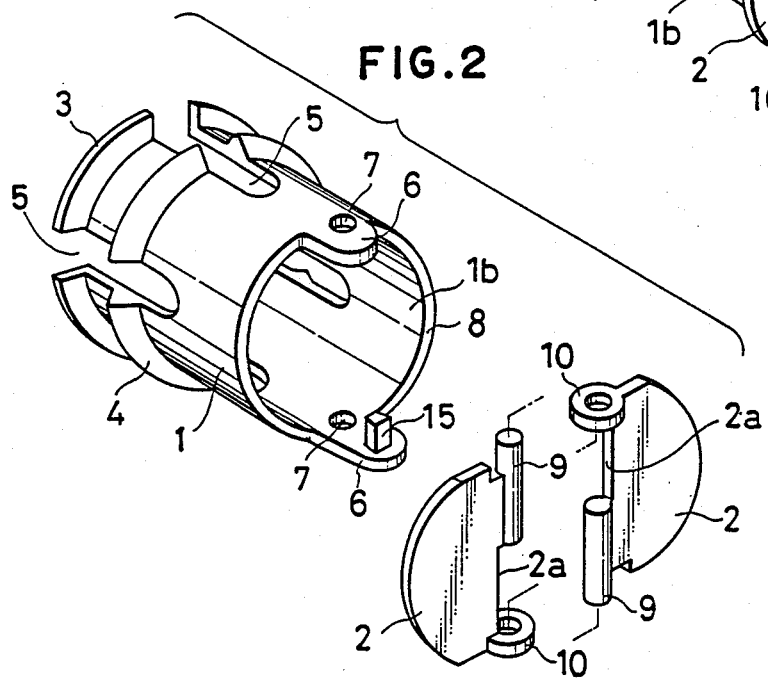
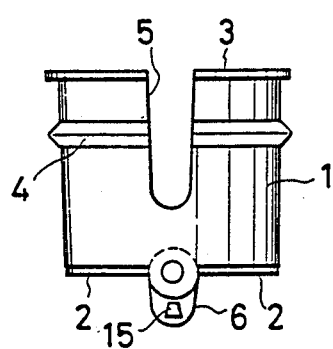
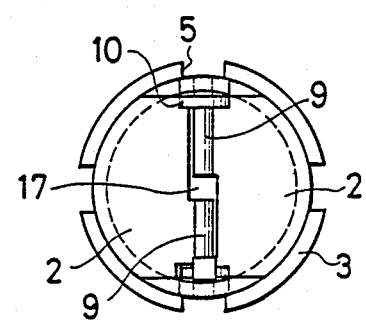

CHECK VALVE

BACKGROUND OF THE INVENTION

1. Field of the Invention

This invention relates to a check valve for preventing the reverse flow of gasoline supplied to a tank through an automotive fuel supply pipe.

More specifically, while various check valves have heretofore been proposed and used, the present invention concerns a check valve which can be inserted in a comparatively small diameter pipe such as a fuel supply pipe for supplying fuel to an automotive gasoline tank such that it will not obstruct fuel supply but closes as soon as a reverse flow occurs.

2. Prior Art Statement

As check valves for insertion in liquid supply pipes, there are known those disclosed in Japanese Utility Model Publications SHO 54(1979)-36334, 56(1981)-5638 and 56(1981)-49015.

Of these check valves, those disclosed in the Japanese Utility Model Publications SHO 54(1979)-36334 and 56(1981)-49015 are for insertion in a pipe. Either of these valves is opened by a pressure of liquid flowing in one direction, while it is closed when reverse flow of the liquid occurs. More specifically, each of these valves has two, i.e., upper and lower valve plates. One of these valve plates is pivotally mounted in a pivotal section provided in an inner wall of a valve body, while the other valve plate is pivotally mounted in a pivotal section diametrically crossing a central portion of the valve body. These valve plates are pivotally moved about their pivotal sections when they are opened and closed.

These valves, however, are adapted for use in a large diameter pipe, as disclosed in the aforementioned publications. Therefore, although they do not constitute any substantial obstacle with respect to the flow of liquid when used in a large diameter pipe, they would constitute a great obstacle to flow if used in a small diameter pipe like an automotive fuel supply pipe.

In this case, not only the central pivotal section constitutes an obstacle to flow, but also other pivotal sections projecting from the inner wall of the valve body reduce the effective pipe diameter, thus obstructing the flow, i.e., liquid supply.

In a further aspect, in the prior art check valves, the valve plates are usually closed by their own weight. For this reason, the pivotal section has to be located above the valve plate at all times. If it is located at the wrong position, failure of valve function and other difficulties are likely.

OBJECT AND SUMMARY OF THE INVENTION

An object of the invention is to provide a check valve which can operate reliably even if its orientation is altered when it is used in a small diameter liquid supply pipe.

Another object of the invention is to provide a check valve which can be readily mounted in a liquid supply pipe.

The present invention has been developed through research for achieving the above objects. The check valve of this invention is characterized in that it comprises a hollow cylindrical valve body having a pair of ear-like bearing portions projecting in a diametrically opposed relation to each other from an open end, and a pair of substantially semicircular symmetrical valve plates each having a straight edge with an integral pivot pin provided on one end portion and an integral bearing provided at the other end, the two valve plates being joined together by inserting the pivot pin of each valve plate through the bearing of the other, the pivot pins of the joined valve plates being fitted in the bearing portions of the valve body such that the valve plates can be pivotally moved when they are opened and closed.

The check valve having the above construction according to the invention can be mounted by inserting the hollow cylindrical valve body into a cylindrical pipe connector of a gasoline tank or a fuel supply pipe or a similar pipe body. Normally, the two valve plates are turned about their pivot pins and bearings to be opened by supplied liquid. In the event of the occurrence of a reverse flow of the liquid, the valve plates are biased in the closing direction by the pressure of the reverse flow, so that they are closed with their edges seated on the edge of one open end of the valve body, thus preventing the reverse flow.

The above and other objects and features of the invention will become more apparent from the following detailed description with reference to the accompaning drawings.

BRIEF DESCRIPTION OF THE DRAWINGS

FIG. 1 is a perspective view showing one embodiment of the check valve according to the invention;

FIG. 2 is an enlarged-scale exploded perspective view showing the check valve shown in FIG. 1;

FIG. 3 is a plan view showing the check valve of FIG. 1 in a closed state;

FIG. 4 is a front view showing the check valve of FIG. 1 in the closed state;

DETAILED DESCRIPTION OF THE PREFERRED EMBODIMENT

Figure 5:
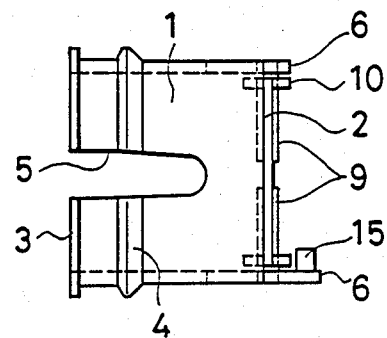
FIG. 5 is a side view showing the check valve of FIG. 1 in the closed state.

FIGS. 1 to 5 illustrate an embodiment of the check valve according to the invention. Referring to the Figures, reference numeral 1 designates a hollow cylindrical valve body, and numeral 2 valve plates mounted on the valve body at one open end thereof.

The valve body 1 is a cylindrical body having a truly circular sectional profile, and it has a flange 3 provided on its outer periphery adjacent to one open end 1a. The flange 3 serves to regulate the depth of the insertion of the valve body 1. The valve body 1 also has an annular locking ridge 4 provided on its outer periphery near the open end 1a. The locking ridge 4 has a hill-like sectional profile. The valve body 1 further has a plurality of (four in this embodiment) elongate notches 5. The elongate notches 5 extend in the axial direction from the open end 1a to a point beyond the flange 3 and the locking ridge 4, so that the end portion of the valve body with the locking ridge 4 is contractable.

The valve body 1 further has a pair of diametrically opposed ear-like bearing projections 6 each having a bearing hole 7. The open end 1b of the valve body with the ear-like projections has a smooth section 8 lying in a plane perpendicular to the axis of the valve body, so that it constitutes a seat for the valve plates.

In this embodiment, the two valve plates 2 are disposed symmetrically. They serve to close the open end 1b of the valve body.

Each of the valve plates 2 is semicircular in shape. Its straight edge 2a is provided on one half portion thereof with an integral pivot pin 9. The pivot pin 9 has an outwardly projecting end. The other half portion of the straight edge 2a is provided adjacent to the outer end with a ring-like bearing portion 10. The pivot pin 9 extends parallel to the straight edge 2a, and the bearing portion 10 on the other half portion of the edge 2a is concentric with the extension of the axis of the pivot pin 9. The hole of the bearing portion 10 has such a diameter that the pivot pin 9 of the other valve plate 2 can be inserted through it.

The two valve plates 2 are symmetrical even when their orientation is changed. The two valve plates 2 are joined together in an edge-to-edge relation, as shown in FIG. 2. More specifically, they are joined together by inserting the outwardly projecting end portion of the pivot pin 9 of each of them through the ring-like bearing portion 10 of the other such that their straight edges 2a are parallel to each other.

The two valve plates 2, which are thus joined with the end of the pivot pin 9 of each of them inserted through the ring-like bearing portion 10 of the other, assume a disk-like form in their extended state, and are hinged together about their aligned pivot pins 9.

The valve plates 2 joined together in the above way are coupled to the valve body by fitting the ends of the pivot pins 9 projecting from the opposite ends of the hinge section into the bearing holes 7 of the ear-like projections 6 by forcibly displacing the ear-like projections away from each other with the pivot pin ends.

The use of the check valve having the above construction according to the invention will now be described with reference to FIGS. 6 and 7.

These Figures illustrate a case in which the check valve is mounted in a cylindrical pipe connector 12 of a gasoline tank 11 for preventing the reverse flow of gasoline supplied through a fuel supply pipe 13. The check valve is mounted by forcibly inserting the valve body 1 from the open end 1b thereof into the pipe connector 12.

The valve body 1 and valve plates 2 are moldings of a synthetic resin material. When mounting the valve body 1, it is snap fitted by making use of the elasticity of its material. The pipe connector 12 has a bulged portion 14 formed by a bulging process. The locking ridge 4 of the valve body 1 is locked in the bulged portion 14 when the valve body is mounted. In this state, the valve body will not become detached by accident. When the valve body is inserted, the elongate notches 5 permit the contraction of the valve body to facilitate the insertion of the locking ridge 4.

After the check valve has been mounted, the fuel supply pipe 13 is fitted on the pipe connector 12, thus completing the mounting of the check valve and connection of the fuel supply pipe.

Figure 6:
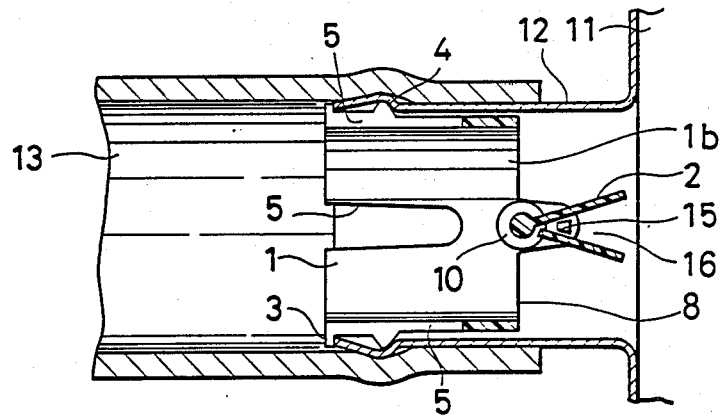
FIG. 6 is an axial sectional view showing the check valve of FIG. 1 in an open state.
Figure 7:
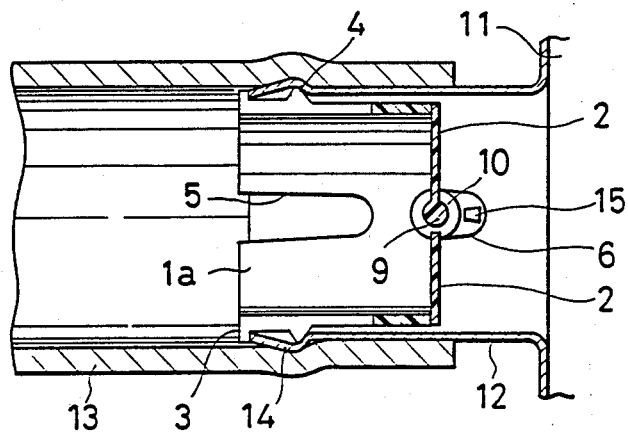
FIG. 7 is an axial sectional view showing the check valve of FIG. 1 in a closed state.

When it is thus mounted, the check valve is opened about the pivot pins 9, as shown in FIG. 6, by the pressure of gasoline supplied from the side of the fuel supply pipe 13, thus permitting the fuel supply to the gasoline tank 11. At this time, the two open valve plates 2 strike a stopper 15 projecting from one of the ear-like projections 6 and are held in a back-to-back relation to each other. The stopper 15 prevents the two valve plates from being overlapped and from being kept one open and the other closed. The stopper 15 further defines a gap 16 between the open valve plates. When reverse flow of gasoline occurs, the pressure of the reverse flow is directly received by the back surfaces of the two valve plates, thus ensuring quick closing thereof.

The valve plates 2 normally do not assume any fixed posture but are naturally oriented and are opened about the pivot pins 9 at the time of the fuel supply.

When gasoline in the gasoline tank tends to flow in reverse because the tank is too full or is rocked, the resulting reverse flow pressure is received by the back surfaces of the two valve plates 2 in the V-shaped open state with a gap 16 between them. The valve plates 2 are thus closed about the pivot pins 9 to the state as shown in FIG. 7.

In the above embodiment, a gap 17 can be defined between the opposed ends of the pivot pins 9 of the two valve plates 2. This gap 17 provides the spatial allowance needed when fitting the pivot pin 9 of each of the valve plates to the ring-like bearing portion 10 of the other. This gap can be dispensed with if, for instance, the pivot pins are made flexible by reducing their diameter.

While one preferred embodiment of the invention has been described, it will be understood from the described construction that with the check valve according to the invention the valve plates are opened about their pivot pins to permit flow in one direction while they are closed with their edges seated on one open end of the valve body to check the flow in the opposite direction. An effect of preventing the reverse flow thus can ee obtained. Further, with the check valve according to the invention two, substantially semicircular valve plates are combined such that they are turned about their aligned pivot pins when they are opened and closed. Thus, it is possible to make the aperture area of the valve in the open state greatest. The check valve thus can be effectively utilized for small diameter pipes without obstructing the flow of fluid.

Besides, the pivot pins supporting the valve plates according to the invention are integral with the valve plates themselves, and their diameter may be made substantially equal to the thickness of the valve plates. It is thus possible to ensure a large aperture area compared to the prior art structure, in which a bar for pivot coupling is provided such that it crosses the opening of the valve body.

Further, the check valve according to the invention is not closed by the weight of the valve plates themselves but is closed when the valve plates receive the pressure of reverse flow. Therefore, it is possible to provide a highly reliable check valve which is reliably operable irrespective of the mounting orientation of the valve plates.

Further, the check valve according to the invention has a very simple structure consisting of a combination of two valve plates hingedly joined together and having an identical shape, and a hollow cylindrical valve body. Therefore, the check valve can be readily manufactured. Further, it can be readily mounted by merely forcibly inserting and fitting it in a counterpart pipe-like member such as a cylindrical pipe connector as described in the above embodiment.

Further, while the above embodiment of the check valve is for preventing the reverse flow of gasoline from a gasoline tank, this application is by no means limitative, but the invention is applicable to any kind of pipe through which liquid or other fluid flows.

What is claimed is:

1. A check valve comprising:
   a hollow cylindrical valve body having a pair of ear-like bearing projections projecting in a diametrically opposed relation to each other from an open end; and
   a pair of substantially semicircular symmetrical valve plates each having a straight edge with an integral pivot pin provided on one end portion and an integral bearing portion provided at the other end, said two valve plates being joined together by inserting the pivot pin of each of them through the bearing portion of the other, the pivot pins of said joined valve plates being fitted in said bearing projections of said valve body such that said valve plates can be pivotally moved when they are opened and closed.

* * * * *